(12) United States Patent
Matsumura et al.

(10) Patent No.: US 6,269,077 B1
(45) Date of Patent: Jul. 31, 2001

(54) ATM LINK SWITCHING OVER METHOD AND APPARATUS

(75) Inventors: Kenji Matsumura; Toru Yamamoto, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/104,371

(22) Filed: Jun. 25, 1998

(30) Foreign Application Priority Data

Jun. 27, 1997 (JP) .................................................. 9-170847

(51) Int. Cl.$^7$ .................................................. H04L 12/28
(52) U.S. Cl. .................................................. 370/218; 370/219
(58) Field of Search .................................. 370/218, 219, 370/220, 399

(56) References Cited

U.S. PATENT DOCUMENTS

| | | | |
|---|---|---|---|
| 5,274,633 | * 12/1993 | Kato et al. | 370/60 |
| 5,390,163 | * 2/1995 | Itoh et al. | 370/13 |
| 5,488,606 | * 1/1996 | Kakuma et al. | 370/16 |

FOREIGN PATENT DOCUMENTS 6-6372    1/1994  (JP) .

* cited by examiner

*Primary Examiner*—Melvin Marcelo
(74) *Attorney, Agent, or Firm*—Sughrue, Mion, Zinn, Macpeak & Seas, PLLC

(57) ABSTRACT

A system switching over method and apparatus for duplicated ATM (asynchronous transfer mode) switch, which enables keeping the delay quality of each cell unchanged without any cell loss, are realized. At the time of system switching over, the system-switching control unit in each system (a system previously in operation and a system newly in operation) mutually communicates each other and manages a temporary cell storage unit, in which cells to be read out are stored in accordance with the delay priority group, in each system, and reads out cells in the order of higher delay priority whichever the system is. A delay priority selector in the system of an operation state is controlled to provide a cell read out path for outputting cells depending on a system from which the cell being read out.

8 Claims, 5 Drawing Sheets

ATM LINK SWITCHING OVER METHOD AND APPARATUS

BACKGROUND OF THE INVENTION

This invention relates to a system switching over process for duplicated ATM (asynchronous transfer mode) switch as an active system and a stand-by system.

DESCRIPTION OF THE RELATED ART

FIG. 5 outlines the constitution of a conventional duplicated ATM switch which is disclosed in Japanese Unexamined Patent Publication No. Hei 6-6372.

In FIG. 5, the ATM switch is duplicated as an active system, currently in operation, and a stand-by system, waiting for being switched over as active system of the next time, and each system comprises a temporary cell storage unit 510 or 520 and a supervisory unit 511 or 521.

An incoming cell flow to the ATM switch from an input is directed to the active system by an input selector, and an outgoing cell flow switched by the active system is selected a route to an output by an output selector. The temporary cell storage unit temporarily stores incoming cells in each storage area depending on a delay class provided with each cell, and reads out each cell for switching from storage area in the order of higher delay priority to maintain the delay priority qualities of individual cells. For example, cells with CBR (Constant Bit Rate) are usually for real time data such as voice or moving pictures, and allowance of delay time is very severe for those cells. Therefore, high delay priority is allocated to those cells and the delay priority quality is maintained by the foregoing operation.

When the active and stand-by systems are switched over, the input selector changes the direction of incoming cell flow from the active system to the stand-by system (system newly to be put in an operation state), and as the result, incoming cells are now temporarily stored in the temporary cell storage unit 520 instead of the temporary cell storage unit 510. On the other hand, remaining cells being stored in the temporary cell storage unit 510 of the active system (system previously in the operation state) should be output even in this state in order to prevent any cell from being lost. Therefore, the supervisory unit 511 supervises contents of the temporary cell storage unit 510 if all cells having been output and no cell is remained.

When the supervisory unit 511 has confirmed that no cell being remained in the temporary cell storage unit 510, the supervisory unit 511 sends this state to the supervisory unit 521 of the stand-by system (system in operation state now) to allow to start operation as new active system, and also this state is transferred to the output selector to instruct to switch over output cell flow route from the active system to the stand-by system.

Through these procedures, it is possible to switch from one system to the other or vice versa over duplicated ATM switch without causing any loss in cell transmission during switching over operation.

In the conventional example described above, generally it is no problem as long as the temporary cell storage unit of the active system has no cell left at the time of switching over operation. However, if the temporary cell storage unit of the active system has any cells left at the time of switching over operation, it causes the following problem. For example, let's assume that the temporary cell storage unit of the active system is still storing cells with a low delay priority at the time of system switching over. In this case, although incoming cells with a high delay priority are stored in the temporary cell storage unit of the stand-by system (system newly put in the operation state), they should be waited for outputting until all cells with a low delay priority stored in the temporary cell storage unit of active system (system previously in operation) have been completely flowed out.

Namely, as long as the time period during system switching over being performed is concerned, the delay priority of individual cells is ignored, and cells stored in the temporary cell storage unit of active system (system previously in operation) always flow out first even if they have a low delay priority. As a result, even a cell with a high delay priority becomes to have a large CDVT (Cell Delay Variation Tolerance), and is degraded in its delay quality.

SUMMARY OF THE INVENTION

The present invention intends to provide an apparatus and method of an ATM link switching over from an active system to a stand-by system for a duplicated ATM switch for solving above problems and maintaining the delay qualities of involved cells.

To attain above object, the present invention provides an apparatus of an ATM link switching over for a duplicated ATM switch comprises a temporary cell storage unit in each of active and stand-by systems for storing incoming cells in accordance with a delay priority provided with each cell, and control means for arbitrating cell reading from which temporary cell storage unit is to be performed depending on cell storage condition and delay priority in each temporary cell storage unit at the time of system switching over.

In more detail, the apparatus of an ATM link switching over a duplicated ATM switch comprises an input selector for transferring incoming cells from an input line to a system currently being operated, an output selector for transferring outgoing cells from a system currently being operated to an output line, a temporary cell storage unit in each of active and stand-by systems for storing incoming cells in accordance with a delay priority provided with each cell transferred from said input selector, and system-switching control means for detecting cell information including delay priority stored in each temporary cell storage unit in both of active and stand-by systems, for instructing one of temporary cell storage units storing a cell having the highest delay priority among both of active and stand-by systems to read out the cell, and for outputting the read out cell from one of temporary cell storage units selectively to said output selector.

Further, the system-switching control means comprises a system-switching control unit in each of active and stand-by systems for communicating with the system-switching control unit in the other system each other and detecting cell information including delay priority stored in each of temporary cell storage units in both of active and stand-by systems, and for instructing the temporary cell storage unit of own system if storing a cell having the highest delay priority among cells in both of own and the other systems to read out the cell, and outputting system information indicating the system from which a cell being read out, and a delay priority selector in each of active and stand-by systems, which is connected to both of temporary cell storage units in own system and in the other system each other, for outputting a read out cell from either of temporary cell storage unit selectively according to the system information output from the system-switching control unit.

The system-switching control unit outputs the system information to the delay priority selector of own system if own system state is currently in operation, and outputs the system information to the delay priority selector of the other system through the system-switching control unit of the other system if the other system state is currently in operation.

The system-switching control unit further comprises a cell management section, a selector control section and an inter-system communication section.

The cell management section is provided for memorizing cell information including length of queue to be read out for each delay priority stored in the temporary cell storage unit of own system and other system, for providing an instruction of cell reading out to the temporary cell storage unit of own system if a cell having the highest delay priority among cells in the both systems being stored in own system, and for outputting the system information when the cell being read out from own system.

The selector control section is provided for instructing the delay priority selector of own system for allowing to pass the read out cell from the temporary cell storage unit indicated by the system information being received.

The inter-system communication section is provided for communicating with the inter-system communication section of other system for exchanging cell information including delay priority stored in the temporary cell storage unit of each system, and for repeating the system information, when transferred from other system, to the selector control section of own system.

Also, the present invention provides a method of an ATM link switching over for a duplicated ATM switch comprises the following steps:

(1) storing incoming cells having been arrived in a temporary storage unit, in a system currently in operation, in accordance with a delay priority provided with each cell; and (2) arbitrating cell reading from which temporary cell storage unit, in a system currently in operation or in a system previously in operation, is to be performed depending on cell storage condition and delay priority in each temporary cell storage unit at the time of system switching over.

In more detail, a method of an ATM link switching over for a duplicated ATM switch comprises the following steps:

(1) transferring incoming cells from an input line to a system currently being operated;

(2) storing incoming cells having been arrived in a temporary storage unit, in a system currently in operation, in accordance with a delay priority provided with each cell;

(3) detecting cell information including delay priority stored in each temporary cell storage unit in both of systems currently in operation and previously in operation;

(4) instructing one of temporary cell storage units storing a cell having the highest delay priority among both systems to read out the cell; and (5) outputting the read out cell from one of temporary cell storage units selectively to an output line. said output selector.

Further, the following steps are also included in the present invention.

(1) transferring incoming cells from an input line to a system currently being operated;

(2) storing incoming cells having been arrived in a temporary storage unit, in a system currently in operation, in accordance with a delay priority provided with each cell;

(3) communicating with other system and detecting cell information including delay priority stored in each of temporary cell storage units in both systems of currently in operation and previously in operation;

(4) instructing the temporary cell storage unit of own system, if a cell having the highest delay priority among cells in both systems being stored in own system, to read out the cell;

(5) outputting system information indicating the system from which a cell being read out; and (6) outputting a read out cell from either of temporary cell storage unit selectively according to the system information.

DETAILED DESCRIPTION OF PREFERRED EMBODIMENTS

Preferred embodiments of the present invention will be described with reference to attached figures.

Figure 1:
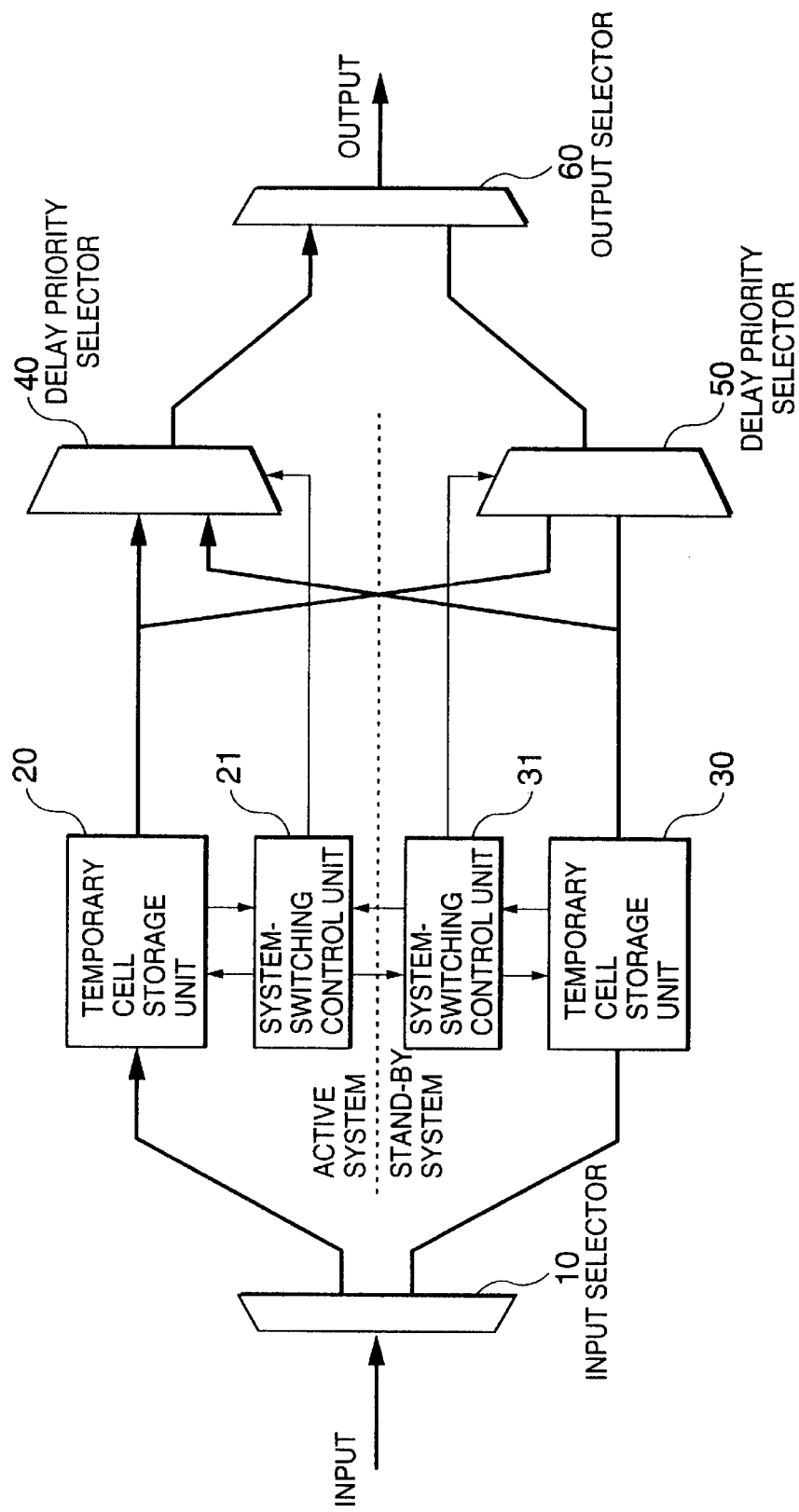
FIG. 1 is a block diagram illustrating the principle of the present invention.

FIG. 1 outlines the constitution of a duplicated ATM switch according to the present invention, and also outlines the principle of ATM link switching over method and apparatus of the present invention.

In FIG. 1, the ATM switch is duplicated as an active system, currently in operation, and a stand-by system, waiting for being switched over as active system of the next time, and each system comprises a temporary cell storage unit 20 or 30, a system-switching control unit 21 or 31 and a delay priority selector 40 or 50. An incoming cell flow to the ATM switch from an input is directed to the active system by an input selector 10, and an outgoing cell flow switched by the active system is selected a route to an output by an output selector 60.

The temporary cell storage unit 20 or 30 temporarily stores incoming cells in each storage area depending on a delay class provided with each cell, and reads out each cell for switching from storage area in the order of higher delay priority to maintain the delay priority qualities of individual cells.

The system-switching control unit 21 or 31 performs control operations at the time of the system switching over from the active system to the stand-by system.

Each delay priority selector 40 or 50 is connected with outputs of the temporary cell storage units 20 and 30 of both the active and stand-by systems, and selects cells to be output from either side of the active system or the stand-by system in accordance with the control of the system-switching control unit 21 or 31.

Then, the ordinary operation of the duplicated ATM switch will be described. Let's assume that in ordinary operation, input cells pass only through the active system, and no entry of cells to the stand-by system and their accumulation there occur neither.

When cells arrive at the duplicated ATM switch through an input line, the input selector 10 receives them and transfers them to the active system switch (system currently in operation). Each cell transferred into the active system is classified according to the delay class provided with, and stored in the temporary storage unit 20, being kept classified according to the delay class. The system-switching control unit 21 instructs to the temporary cell storage unit 20 to read out cells in the order of higher delay priority. Thus cells are read out successively in the order of their delay priorities. The cells read out in the order of their delay priorities pass through the delay priority selector 40, and also through the output selector 60 which selects cells from the active system as output.

Let's assume that in the meantime the temporary cell storage unit 20 of active system still retains cells with low delay priorities.

Under these circumstances, explanation will be made for the system switching over operation of the duplicated ATM switch, and it is also assumed that, at this time, cells having delay priorities higher than those of the cells still retained by the temporary cell storage unit 20 flow into the duplicated ATM switch.

The input selector 10 is switched over, and input cells start to enter the stand-by system switch (system newly put into operation). Further, the output selector 60 starts to deliver output from the stand-by system. The temporary cell storage unit 20 of active system (system previously in operation) still retains cells with low delay priorities, while cells with higher delay priorities accumulate in the temporary cell storage unit 30 of stand-by system.

The system-switching control units 21 and 31 mutually communicate each other and manage the temporary cell storage units 20 and 30, and read out cells stored in both storage units in the order of their delay priorities. In the example under study, firstly, cells in the temporary cell storage unit 30 of stand-by system (system newly in operation) are read out until cells whose delay priorities are higher than those of the cells stored in the temporary cell storage unit 20 of active system (system previously in operation) have been exhausted, and then the cells stored in the temporary cell storage unit 30 of active system start to be read out.

Each of the delay priority selectors 40 and 50 is controlled by the system-switching control units 21 and 31 respectively, and determines from which system out of the active system (system previously in operation) and stand-by system (system newly in operation) cells are to be delivered to the output selector 60. As far as the delay priority selector 40 is concerned, it is stopped its operation now as it is in the active system (system previously in operation), and the delay priority selector 50 performs selective operation in accordance with the control of the system-switching control unit 31. Therefore, when cells from the temporary storage unit 31 are read out, the system-switching control unit 31 instructs the delay priority selector 50 to select cells output from the temporary cell storage unit 30 for outputting those cells to the output selector 60, and when the right for reading out cells is handed over to the system-switching control unit 21, it means that cells are to be read out from the temporary cell storage unit 20, and then the system-switching control unit 31 instructs the delay priority selector to select cells output from the temporary cell storage unit 20 for outputting those cells to the output selector 60.

The ATM link switching over operation based on these steps makes it possible to provide a sequence by which duplicated ATM switch can be safely switched over without degrading the delay quality of involved cells.

Figure 2:
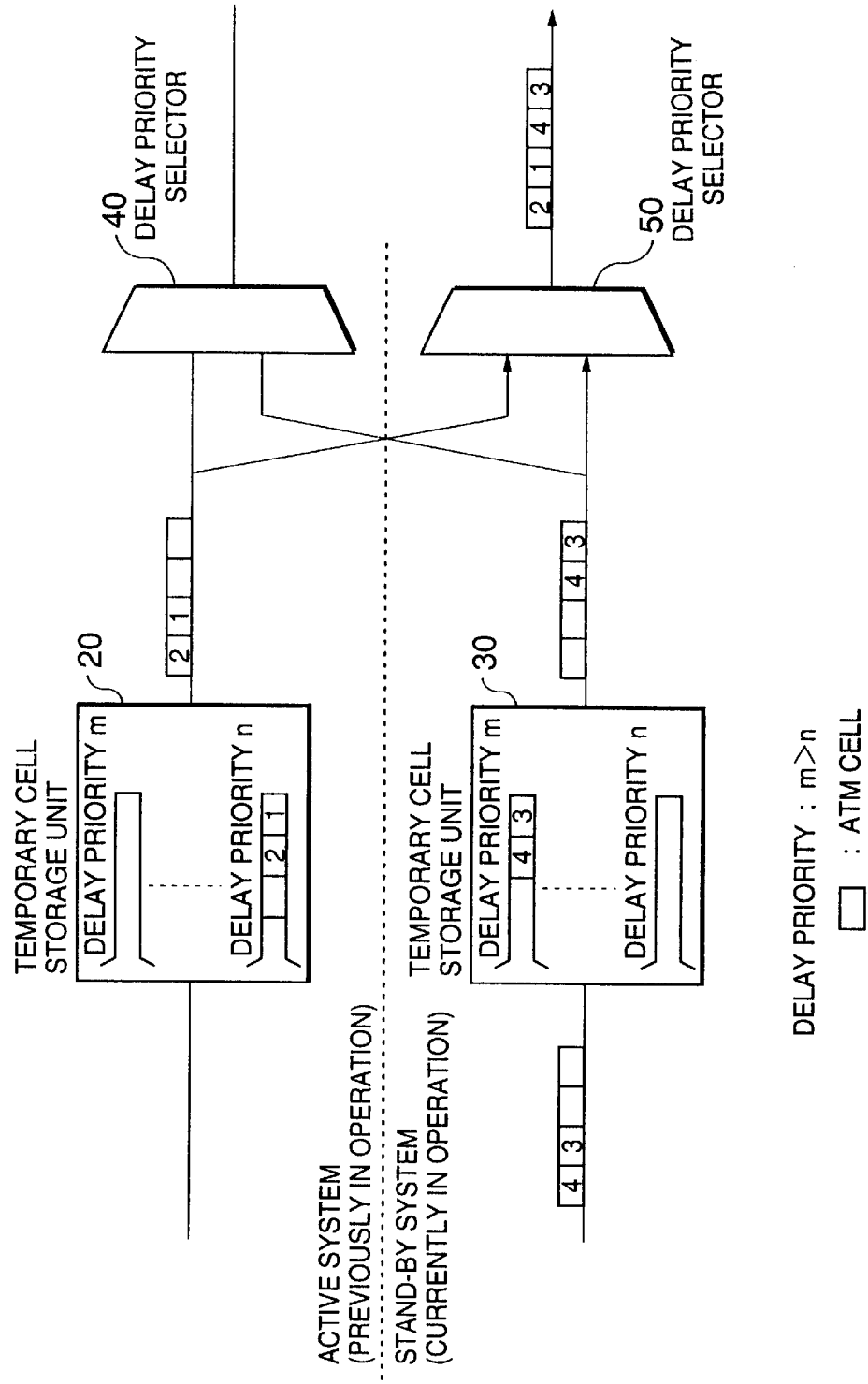
FIG. 2 is a block diagram illustrating how the present invention operates.

FIG. 2 is a block diagram illustrating the operation of the present invention. Let's assume, in the same manner as described above, while cells (1, 2) with the delay priority n are stored in the temporary cell storage unit 20 of active system, the systems are switched over, and cells (3, 4) with the delay priority m are flowing into the temporary cell storage unit 30 of stand-by system (system newly put in operation), where the delay priority m has a higher priority than the delay priority n.

The present invention enables simultaneous control of the temporary cell storage unit 20 of active system (system previously in operation) and the temporary cell storage unit 30 of stand-by system (system newly in operation) so that cells in them can be read out in the order of their delay priorities.

In this example of FIG. 2, firstly, cells (3, 4) in the temporary cell storage unit 30 are read out and delivered to the output selector 60 (not shown in FIG. 2) through the delay priority selector 50, and next, cells (1, 2) are read out from the temporary cell storage unit 20 and delivered to the output selector 60 through the delay priority selector 50 which is instructed to pass cells from the temporary cell storage unit 20. As the result, output of cells is in the order of (3, 4, 1, 2), and hence it is possible to maintain the delay qualities of individual cells even while the systems are being switched over.

Figure 3:
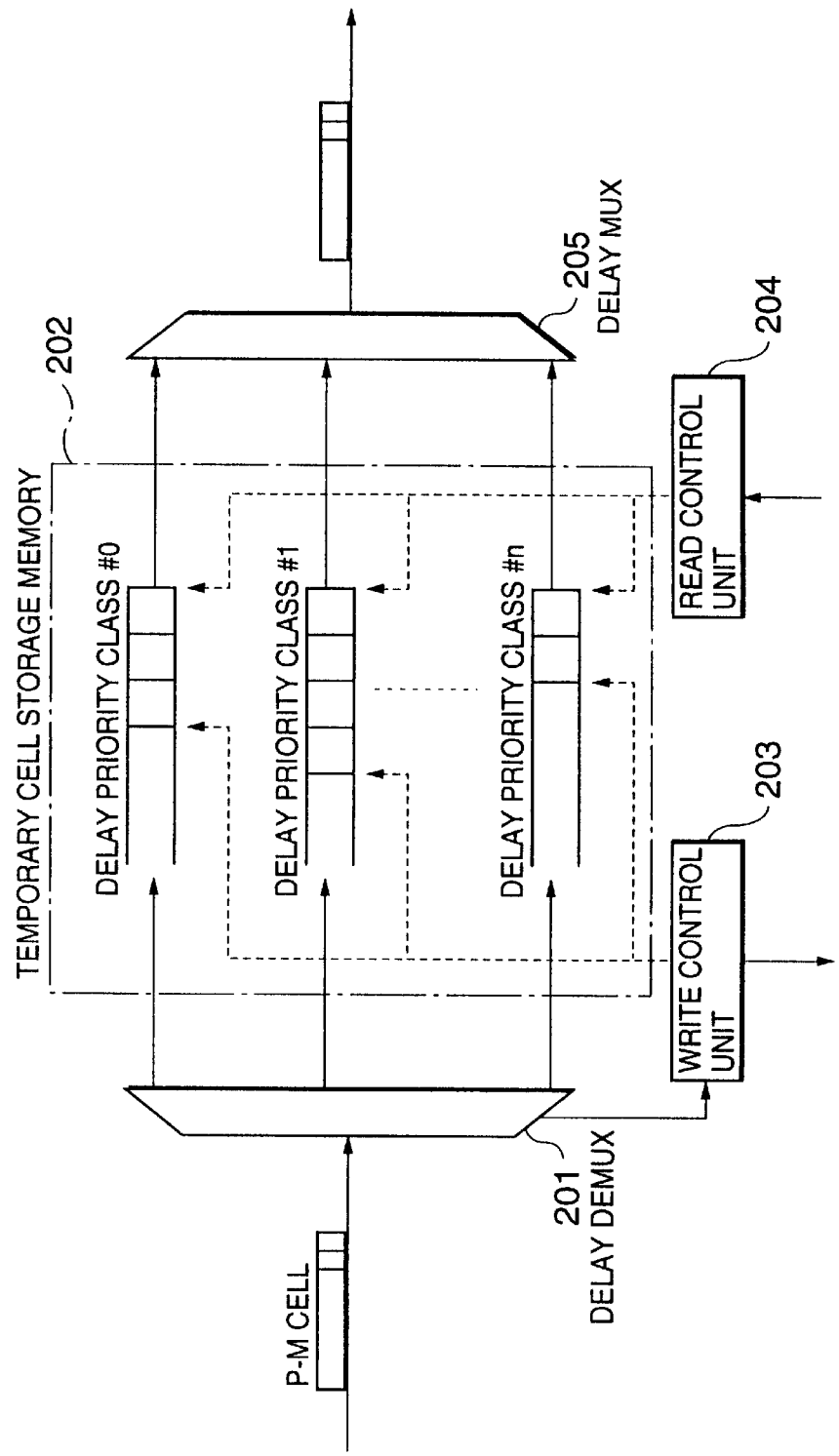
FIG. 3 is a block diagram illustrating the constitution of one example of a temporary cell storage unit of the present invention.

FIG. 3 is a block diagram illustrating the constitution of one example of the temporary cell storage unit 20 or 30 of the present invention. This temporary cell storage unit comprises a delay DEMUX (demultiplexer) 201 which classifies and separates each of input cells according to their delay classes, a temporary cell storage memory 202 to temporarily store input cells according to their delay classes, a write control unit 203 to control the write addresses of input cells into the temporary cell storage memory, a read control unit 204 to manage the read addresses of output cells from the temporary cell storage memory, and a delay MUX (multiplexer) 205 to multiplex each output cell from the temporary cell storage memory according to delay classes to a flow of cells to be output.

The operation of the circuit shown in FIG. 3 will be described. Firstly, when cells arrive, the delay DEMUX 31 detects the delay priority provided with each cell, and classifies into cell groups depending on the delay priority of each cell and transfers them to the temporary cell storage memory partitioned by the delay priority. The temporary cell storage memory receives the cell groups for each delay priority and stores them according to the storage address instructed by the write control unit 203 for each delay priority. On the other hand, when the read control unit 204 receives the data read out instruction from the system-switching control unit, the read control unit 204 starts to read out cells in the temporary storage memory 202 one by one from the cell group having the highest delay priority. When a read address for reading out a cell coincides with a write address for writing a cell in a same priority group, it means that all cells in the same priority group have been read out, and then cells in the next priority order group are to be read out. Each cell read out from the temporary storage memory 202 is transferred to the delay MUX 205, and multiplexed into a flow of cells for outputting.

Figure 4:
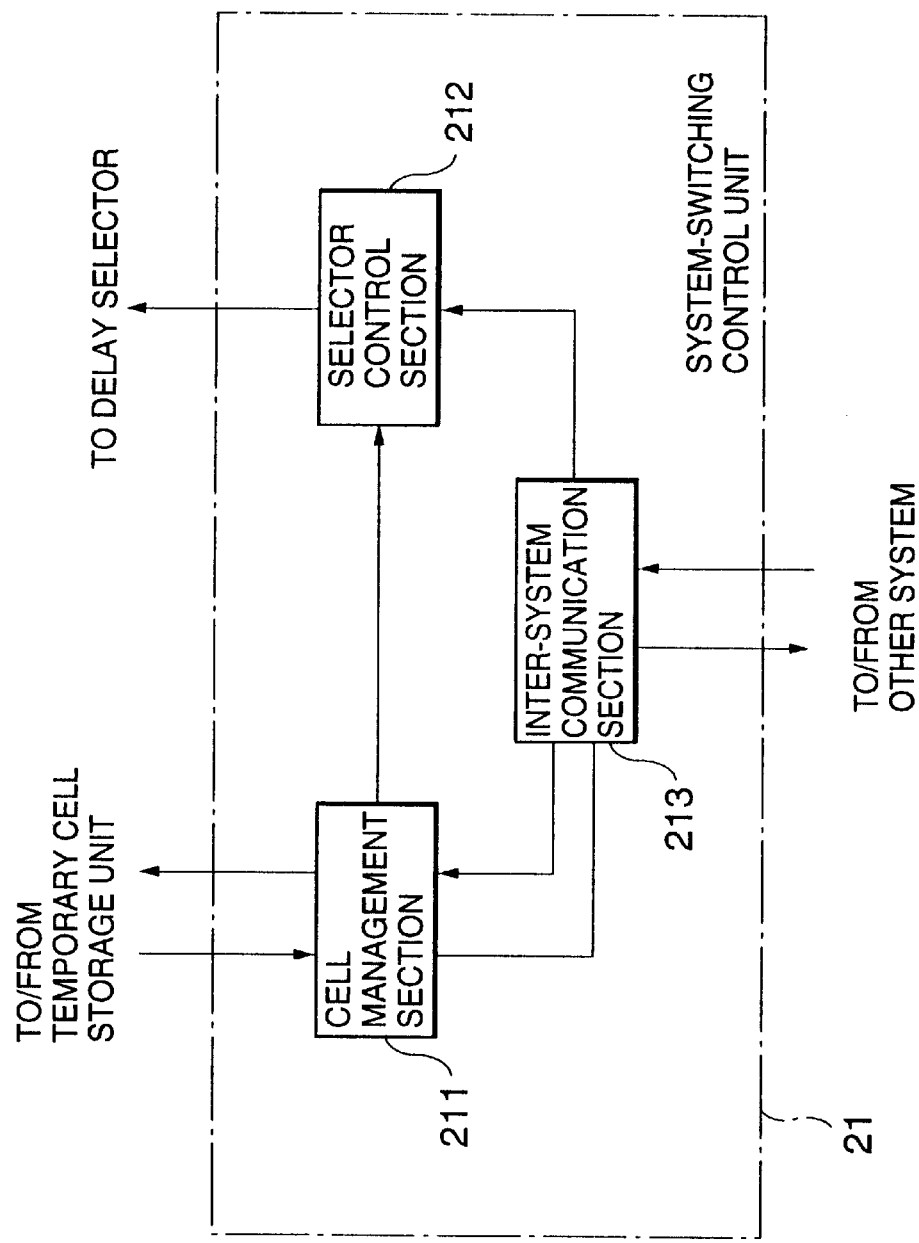
FIG. 4 is a block diagram illustrating the constitution of one example of a system-switching control unit of the present invention.
Figure 5:
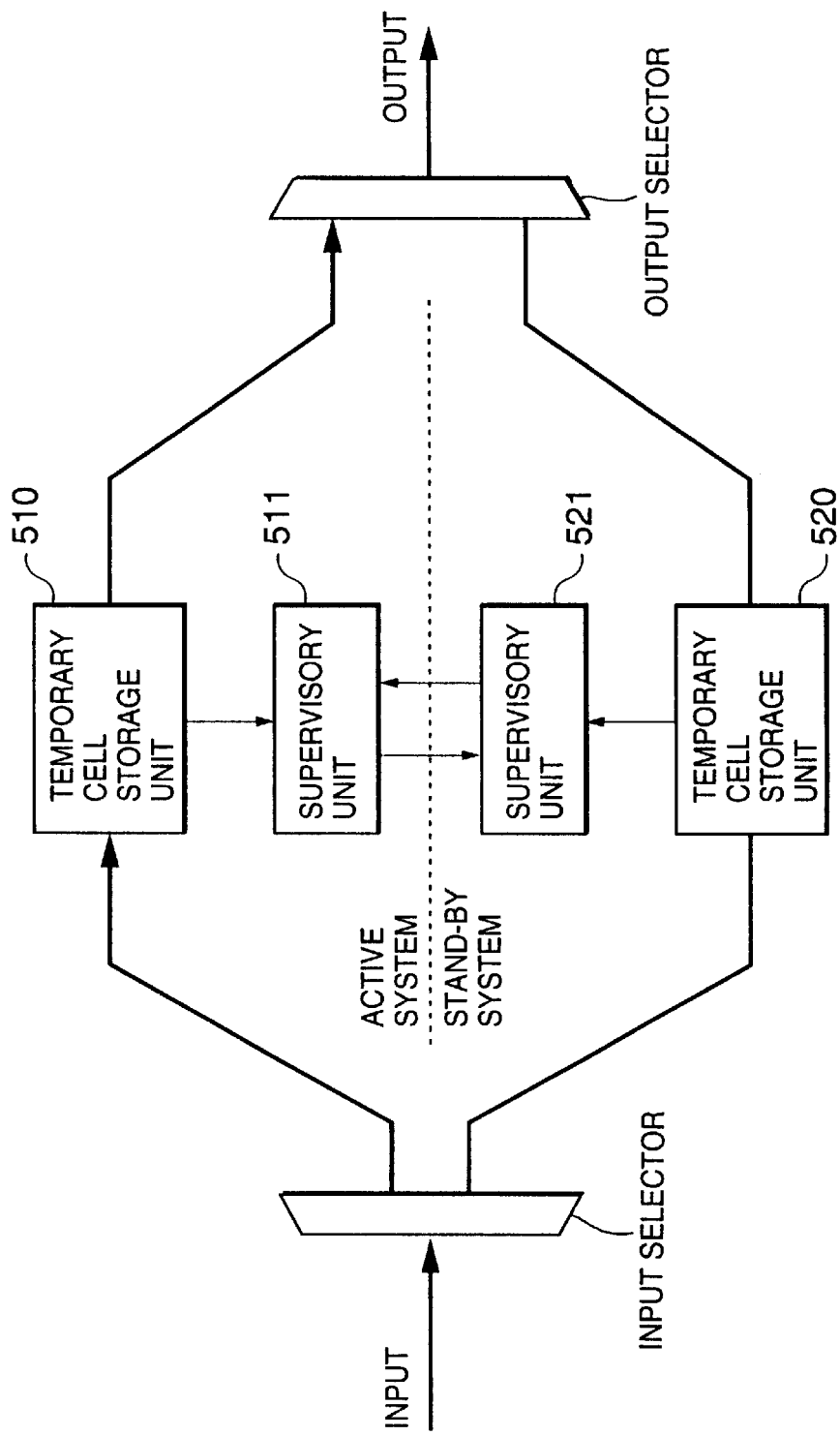
FIG. 5 is a block diagram illustrating the constitution of a conventional system.

FIG. 4 is a block diagram illustrating the constitution of one example of the system-switching control unit 21 or 31 of the present invention.

The system-switching control unit comprises a cell management section 211 which memorizes information of cells, i.e. current write address for each priority group and length of queue to be read out for each priority group, etc., stored in the temporary cell storage unit of own system and other system and provides an instruction of cell reading out to the temporary cell storage unit of own system, a selector control section 212 to control the delay priority selector of own system for instructing cells from which temporary cell storage unit are to be output, and an inter-system communication section 213 to communicate with inter-system communication section of other system for arbitrating cell reading from which temporary cell storage unit is to be performed depending on cell storage condition and delay priority in each temporary cell storage unit at the time of system switching over.

The circuits of FIG. 4 will operate as follows.

When cells are stored in the temporary cell storage unit, information regarding how many cells with which delay priority are stored is transmitted to the cell management section 211. The cell management section 211 also receives the corresponding information regarding cell storage in the temporary cell storage unit of other system through the inter-system communication section 213, and also transmits its own information to the other system at the time of system switching over.

The cell management section 211 finds a cell with the highest delay priority of all the cells currently stored in its own system and in the other system. When the cell management section 211 has found that the cell having the highest delay priority being stored in its own system, it instructs its own temporary cell storage unit to read out that cell. Moreover, when the cell management section 211 has found that its own system being the stand-by system (system newly in operation), the cell management section 211 instructs the selector control section 212 to control delay priority selector to select a read out path from its own system. Alternatively, if the cell management section 211 has found that its own system being the act system (system previously in operation), the cell management section 211 instructs the selector control section 212 of the other system (stand-by system) through the inter-system communication sections 213 to control delay priority selector to select a read out path from the other system (act system).

As described in detail above, according to the present invention, it is possible to provide a method and apparatus by which duplicated ATM switch can be safely switched over while keeping the delay qualities of cells intact.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. An apparatus of an ATM link switching over from an active system to a stand-by system for a duplicated ATM switch comprising:
    a temporary cell storage unit in each of active and stand-by systems for storing incoming cells in accordance with a delay priority provided with each cell; and
    control means for arbitrating cell reading from which temporary cell storage unit is to be performed depending on cell storage condition and delay priority in each temporary cell storage unit at the time of system switching over.

2. An apparatus of an ATM link switching over from an active system to a stand-by system for a duplicated ATM switch comprising:
    an input selector for transferring incoming cells from an input line to a system currently being operated;
    an output selector for transferring outgoing cells from a system currently being operated to an output line;
    a temporary cell storage unit in each of active and stand-by systems for storing incoming cells in accordance with a delay priority provided with each cell transferred from said input selector; and
    system-switching control means for detecting cell information including delay priority stored in each temporary cell storage unit in both of active and stand-by systems, for instructing one of temporary cell storage units storing a cell having the highest delay priority among both of active and stand-by systems to read out the cell, and for outputting the read out cell from one of temporary cell storage units selectively to said output selector.

3. The apparatus of an ATM link switching over from an active system to a stand-by system for a duplicated ATM switch according to claim 2, said system-switching control means further comprising:
    a system-switching control unit in each of active and stand-by systems for communicating with the system-switching control unit in the other system each other and detecting cell information including delay priority stored in each of temporary cell storage units in both of active and stand-by systems, and for instructing said temporary cell storage unit of own system if storing a cell having the highest delay priority among cells in both of own and the other systems to read out the cell, and outputting system information indicating the system from which a cell being read out; and
    a delay priority selector in each of active and standby systems, being connected to both of temporary cell storage units in own system and in the other system each other, for outputting a read out cell from either of temporary cell storage unit selectively according to the system information output from said system-switching control unit.

4. The apparatus of an ATM link switching over from an active system to a stand-by system for a duplicated ATM switch according to claim 3, wherein said system-switching control unit outputs said system information to said delay priority selector of own system if own system state being currently in operation, and outputs said system information to said delay priority selector of the other system through said system-switching control unit of the other system if the other system state being currently in operation.

5. The apparatus of an ATM link switching over from an active system to a stand-by system for a duplicated ATM switch according to claim 3, said system-switching control unit further comprising:
    a cell management section for memorizing cell information including length of queue to be read out for each delay priority stored in the temporary cell storage unit of own system and other system, for providing an instruction of cell reading out to the temporary cell storage unit of own system if a cell having the highest delay priority among cells in the both systems being stored in own system, and for outputting the system information when the cell being read out from own system;
    a selector control section for instructing said delay priority selector of own system for allowing to pass the read out cell from the temporary cell storage unit indicated by the system information being received; and an inter-system communication section for communicating with the inter-system communication section of other system for exchanging cell information including delay priority stored in the temporary cell storage unit of each system, and for repeating the system information, when transferred from other system, to the selector control section of own system.

6. A method of an ATM link switching over from an active system to a stand-by system for a duplicated ATM switch comprising steps of:

storing incoming cells having been arrived in a temporary storage unit, in a system currently in operation, in accordance with a delay priority provided with each cell; and arbitrating cell reading from which temporary cell storage unit, in a system currently in operation or in a system previously in operation, is to be performed depending on cell storage condition and delay priority in each temporary cell storage unit at the time of system switching over.

7. A method of an ATM link switching over from an active system to a stand-by system for a duplicated ATM switch comprising steps of:

transferring incoming cells from an input line to a system currently being operated;

storing incoming cells having been arrived in a temporary storage unit, in a system currently in operation, in accordance with a delay priority provided with each cell;

detecting cell information including delay priority stored in each temporary cell storage unit in both of systems currently in operation and previously in operation;

instructing one of temporary cell storage units storing a cell having the highest delay priority among both systems to read out the cell; and outputting the read out cell from one of temporary cell storage units selectively to an output line. said output selector.

8. A method of an ATM link switching over from an active system to a stand-by system for a duplicated ATM switch comprising steps of:

transferring incoming cells from an input line to a system currently being operated;

storing incoming cells having been arrived in a temporary storage unit, in a system currently in operation, in accordance with a delay priority provided with each cell;

communicating with other system and detecting cell information including delay priority stored in each of temporary cell storage units in both systems of currently in operation and previously in operation;

instructing the temporary cell storage unit of own system, if a cell having the highest delay priority among cells in both systems being stored in own system, to read out the cell;

outputting system information indicating the system from which a cell being read out; and outputting a read out cell from either of temporary cell storage unit selectively according to the system information.

* * * * *